United States Patent
Oinonen

(10) Patent No.: US 12,156,497 B2
(45) Date of Patent: Dec. 3, 2024

(54) METHOD FOR CONTROLLING POWER-TRANSMISSION GEAR, SYSTEM, AND FOREST MACHINE

(71) Applicant: PONSSE OYJ, Vieremä (FI)

(72) Inventor: Mikko Oinonen, Vieremä (FI)

(73) Assignee: PONSSE OYJ, Vieremä (FI)

( * ) Notice: Subject to any disclaimer, the term of this patent is extended or adjusted under 35 U.S.C. 154(b) by 821 days.

(21) Appl. No.: 17/271,166

(22) PCT Filed: Aug. 28, 2019

(86) PCT No.: PCT/FI2019/050610
§ 371 (c)(1),
(2) Date: Feb. 24, 2021

(87) PCT Pub. No.: WO2020/043947
PCT Pub. Date: Mar. 5, 2020

(65) Prior Publication Data
US 2021/0360880 A1    Nov. 25, 2021

(30) Foreign Application Priority Data

Aug. 30, 2018    (FI) .................................... 20185718

(51) Int. Cl.
*A01G 23/08* (2006.01)
*B60W 30/188* (2012.01)
(Continued)

(52) U.S. Cl.
CPC .......... *A01G 23/08* (2013.01); *B60W 30/1886* (2013.01); *G01B 5/0035* (2013.01);
(Continued)

(58) Field of Classification Search
CPC . A01G 23/08; A01G 23/083; B60W 30/1886; B60W 2300/158;
(Continued)

(56) References Cited

U.S. PATENT DOCUMENTS 11,102,940 B2 * 8/2021 Lennings .............. H04W 4/029
2004/0250908 A1 12/2004 Hicks
(Continued)

FOREIGN PATENT DOCUMENTS

DE    102015014861 A1    12/2016
FI         101016 B     3/1998
(Continued)

OTHER PUBLICATIONS

Supplementary European Search Report in corresponding European Patent Application No. 19856195, date of completion of the search Apr. 13, 2022, 10 pages.
(Continued)

*Primary Examiner* — Tisha D Lewis
(74) *Attorney, Agent, or Firm* — FisherBroyles, LLP; Robert Kinberg

(57) ABSTRACT

A method and system for controlling a power-transmission device in a forest machine having a harvester head includes measuring a selected property of at least two trees with aid of observation means on a basis of electromagnetic radiation at a distance from the trees being measured to create measurement data. The power-transmission device is controlled by software on the basis of the measurement data to change a state of the power-transmission device to optimize energy required to perform an operation of an operating device. The operating device uses the energy transmitted by the power-transmission device (after the change in state of the power-transmission device) so that operation of the operating device creates a change in the attitude, location, or state of the harvester head.

20 Claims, 4 Drawing Sheets

(51) Int. Cl.
*G01B 5/00* (2006.01)
*G01B 11/02* (2006.01)
*G01B 11/10* (2006.01)
*B64U 10/13* (2023.01)
*B64U 101/30* (2023.01)

(52) U.S. Cl.
CPC .......... *G01B 11/026* (2013.01); *G01B 11/105* (2013.01); *B60W 2300/158* (2013.01); *B60W 2510/1035* (2013.01); *B64U 10/13* (2023.01); *B64U 2101/30* (2023.01)

(58) Field of Classification Search
CPC ......... B60W 2510/1035; B60W 10/04; B60W 10/30; G01B 5/0035; G01B 11/026; G01B 11/105; G01B 11/08
See application file for complete search history.

(56) References Cited

U.S. PATENT DOCUMENTS

| | | |
|---|---|---|
| 2005/0133115 A1 | 6/2005 | Gatz |
| 2010/0065155 A1* | 3/2010 | Peltomae ............ G01B 5/0035 700/167 |
| 2014/0163781 A1* | 6/2014 | Vian .................... G01S 7/4802 701/3 |
| 2016/0138905 A1 | 5/2016 | Einola et al. |
| 2016/0295814 A1 | 10/2016 | Raszga et al. |
| 2017/0079220 A1 | 3/2017 | Hunt |

FOREIGN PATENT DOCUMENTS

| | | |
|---|---|---|
| FI | 111183 B | 6/2003 |
| FI | 20051247 A | 6/2007 |
| FI | 20135603 A | 12/2014 |
| WO | 9923873 A1 | 5/1999 |
| WO | WO-03096794 A1 * | 11/2003 ............. A01G 23/08 |

OTHER PUBLICATIONS

International Search Report in corresponding International Patent Application No. PCT/FI2019/050610, mailed Dec. 2, 2019, 5 pages.
Rossman et al., Realization of a highly accurate mobile robot system for multi purpose precision forestry applications, published 2009 International Conference on Advanced Robotics, Jun. 22-26, 2009, 6 pages.
English Translation of Finnish Search Report in corresponding Finnish Patent Application No. FI20185718, dated Mar. 13, 2019, 4 pages.

* cited by examiner

METHOD FOR CONTROLLING POWER-TRANSMISSION GEAR, SYSTEM, AND FOREST MACHINE

CROSS REFERENCE TO RELATED APPLICATIONS

The present application is United States National Stage application of International Application No. PCT FI2019/050610, filed Aug. 28, 2019 and claiming priority to Finland Application No. 20185718 filed Aug. 30, 2018.

FIELD OF THE INVENTION

The invention relates to a method for controlling a power-transmission device in a forest machine comprising a harvester head, in which method
measuring a selected property of a tree with the aid of observation means in order to create measurement data,
controlling the power-transmission device with the aid of software means, on the basis of the measurement data, to create a change in the state of the power-transmission device, when an amount of energy optimized on the basis of the measurement data in terms of performing a selected operation is transferred to a first operating device belonging to the forest machine,
performing a desired first operation of the operating device using the energy to be transferred using the power-transmission device after the change in state of the power-transmission device, in which the operation of the first operating device creates a change in the attitude, location, or state of the harvester head, or a combination of the aforesaid.
The invention also relates to a system and a forest machine.

BACKGROUND OF THE INVENTION

When performing mechanical timber harvesting, the power demanded momentarily from the forest machine varies considerably between trees of different sizes. Similarly, variations also appear in the operations of the crane attached to the forest machine and further of the harvester head attached to the crane. So that sufficient power is created to handle a tree, the output of the forest machine's engine or the momentary output of the power-transmission components must be able to be changed rapidly. Between handling trees, the energy consumption is sought to be minimized by lowering the revolutions of the engine or the output of the power-transmission components.

From the prior art, publication FI 111183 B is known, which discloses a method for controlling the engine acting as the primary power source of a forest machine. The method is intended to increase the forest machine's engine's output momentarily when the diameter of the tree has been first detected when the harvester head is in contact with the tree.

However, a drawback of the method describe above is that it takes time to increase the output of the engine. Thus, the power needed is not available immediately the harvester head grips the tree. On the other hand, the contact of the harvester head with the tree can be deficient, due, for example, to a branch or gnarl on the rear of the tree from the operator's view. Thus, the increase in power can be based on an erroneous estimate of the size of the tree.

SUMMARY OF THE INVENTION

The invention is intended to create a better method than methods of the prior art and a better system than systems of the prior art, with the aid of which the properties of a tree can be measured more accurately before contact with the tree to be handled, and in which the energy required by the first operating device creating a change in the attitude, location, or state of the harvester head will be available immediately the harvester head makes contact with the tree. In the case of the method, the method is characterized by a method for controlling a power-transmission device in a forest machine comprising a harvester head, in which method at least two selected properties of the tree are measured with the aid of observation means on the basis of electromagnetic radiation at a distance from the tree, in order to create measurement data and the measurement data of at least two trees are stored in a register belonging to a memory for controlling the power-transmission device from the trees' measurement data. In addition, in the method the power-transmission device is controlled with the aid of soft-ware means on the basis of the measurement data in order to create a change in the state of the power-transmission device, when an amount of energy optimized on the basis of the measurement data in terms of performing the selected operation of the first operating device is transferred to the first operating device belonging to the forest machine, and the desired first operation of the first operating device is performed using the energy transferred after the change of state of the power-transmission device using the power-transmission device, in which the operation of the first operating device creates a change in the attitude, location, or state of the harvester head, or a combination of the aforesaid. In addition, in the method the power-transmission device is controlled on the basis of the measurement data of the next tree in the register and the measurement and control operations are repeated.

Using the method according to the invention, electromagnetic radiation is used to determine the measurement data of more than one tree without physical contact with the trees. In other words, the determining of the measurement data is performed remotely and before-hand before the harvester head makes contact with the tree's trunk. The measurement data can then be utilized to create a change of state in the power-transmission device already before the energy-using first operating device of the forest machine needs energy to achieve a change of attitude, location, or state in the harvester head. On the other hand, by measuring the properties of more than one tree at the same time, the energy consumption of the power-transmission device can be optimized rapidly and effectively according to future work tasks. For example, when the first operating device is the engine of the cutting saw of the harvester head, the revolutions of the forest machine's engine acting as the power-transmission device can be raised or lowered to produce a sufficient power level on the basis of the diameter of the tree measured as the tree's measurement data, so that the engine of the cutting saw can provide a sufficient amount of energy already before the harvester head has been used to grip the tree and the cutting saw has begun to operate. Thus, energy consumption can be optimized according to the requirements of the operation of the first operating device and unnecessary waiting in order to achieve a sufficient energy level can be avoided, energy being available immediately contact is made between the harvester head and the tree. As the properties of the next tree to be handled are known on the basis of the measurement, the operating of the power-transmission device can be planned ahead, i.e. in the method optimization is predictive. This is emphasized particularly in situations in which the properties of trees to be handled consecutively differ greatly from each other. Such a situation can be, for example, when handling an extremely small tree, followed by an extremely large tree. Then when measuring at least the two trees it will be known beforehand that the next tree will be large, when, for example, the engine's output can be increased predictively.

Measurement based on electromagnetic radiation is rapid and reliable, as it is not based on the harvester head's contact with the tree, which can be incomplete and thus distort the measurement. In this context, measurement based on electromagnetic radiation refers both to optical measurement and to measurement based on radio waves, which can be performed at a distance from the tree.

The term repetition of measurement and control operation refers to the measurement of the trees to obtain the measurement data being always performed again after processing one tree, as is the control of the power-transmission device on the basis of the measurement data.

Use of the method according to the invention also achieves an even operation of the forest machine, irrespective of the size of the tree, and prevents temporary slowing of the operations of the forest machine due to a lack of operating energy.

Traditionally, measurement of the properties of a tree has been wished to be performed mechanically based on contact, because measurement thus performed is more reliable, gives a more precise result than measurement taking place at a distance, and is easier to implement. For this reason, for example in publication FI 111183 B measurement of the properties of a tree is described by using contact with the tree. In addition, in terms of optimization of power, measurement implemented with the aid of contact also produces information on the weight of the tree, which is important relative to the optimization of power consumption.

On the other hand, present systems intended to optimize power can be considered to operate sufficiently well and not to contain great weaknesses. Partly for this reason the use of measurement based on electromagnetic radiation has concentrated on measuring the proper-ties of trees for inventorying and other measurement-data collection systems.

In this connection, the recognition of problems in present systems intended for power optimization has been a significant part of the invention. Once the problems has been recognized, a solution to them has been begun to be developed, which is disclosed in the present application. It is indeed surprising that the power use of the power-transmission device can be optimised, without knowing the weight of the tree. On the other hand, it is surprising that in a forest-machine environment it is possible to rely on only remote measurement based on electromagnetic radiation when determining the properties of a tree, as there are often obstacles on the ground that can cause errors in measurement based on electromagnetic radiation.

Further, it is surprising that measurement is performed on at least two trees, as the control of the power-transmission device is based on the measurement data of one tree. Thanks to the measurement of two trees, the system has information on the properties of two trees ready for use for the next control of the power-transmission device. On the other hand, however, the control is based on the measurement data of a single tree, so that when processing each tree parameters optimized for the relevant tree can be used. It is surprising that measurement is not performed on one tree at a time, so that a separate tree identification stage is not needed. As an additional advantage, measuring at least two trees gives the measurement greater reliability, as each tree will probably be measured at least twice, thus improving the reliability of the measurement.

According to one embodiment, software means are used to control the power-transmission device on the basis of the measurement data of at least two trees. It is then possible to predict the energy required by the first operating device in the case of several trees already coming for processing.

In the method, a selected property of at least two trees is measured preferably using one or more of the following: optical observation means, radio-wave observation means. With the aid of both observation means, a reliable estimate can be made of the selected property of the tree, without contacting the tree's trunk.

The power-transmission device is preferably controlled with the aid of software means integrated in the forest machine's control system.

The selected property of the tree is preferably one or more of the following group: the tree's diameter, the tree's height, the tree's species, the tree's quality, the tree's volume, the distance of the trees from each other, the number of the tree's branches, and the strength or thickness of the branches. All of these are properties of the tree that affect the energy needed by the first operating device to achieve a change in the attitude, location, or state of the harvester head. The diameter, height, volume, quality, and species of the tree, the number and thickness of branches affect the weight of the tree and through that the energy levels required for operating the both the harvester head and the crane, while the distance of the trees from each other affects the energy level required to move the crane. In addition, the energy levels required to operate both the harvester head and the crane are also affected by ambient conditions, for example, operations directed in an uphill direction, such as the feed of logs and movement of the boom, or the amount of lower vegetation or snow, when a trunk must be towed.

According to one embodiment, in connection with the measurement of a selected property of the trees, not only measurement data is determined but also the initial position data of individual trees, the initial position data being stored with the tree's measurement data together in the memory, in order to form a position data bank of the trees of the area. In addition, in connection with working with the harvester head, second position data of particular tree is determined when the harvester head approaches the tree, and the initial position data and the second position data are compared to identify the tree and control the power-transmission device on the basis of the measurement data of the relevant tree.

In the method, the selected property of each tree can be measured 2-10 times, preferably 3-6 times before the harvester head contacts the tree, to improve measurement reliability. A mean value can be calculated from several measurements while omitting the observations with the greatest deviation out of the calculation as errors. Thus, when carried out several times an error possibly caused by an individual observation can be eliminated and, in that way, a greater accuracy can be achieved in the measurement.

According to one embodiment a camera is used as the optical observation means. Measurement with the aid of a camera is more accurate than using a radio-wave observation means, which can be, for example, a radar.

According to a second embodiment laser measuring means are used in connection with the camera to determine the distance data between the camera and the tree. Thus, with the aid of the camera it is also possible to decide the absolute dimensions of the tree. The laser measuring means can be, for example a Lidar measuring means.

According to a third embodiment a camera or laser measuring means or both are used as the optical observation means. This gives extremely accurate observations of the surround—mgs.

According to a fourth embodiment in the method two cameras or a stereo camera are used to create a three-dimensional image and through it to determine the absolute dimensions of the tree. There is then no need for separate observation means, such as radar or a laser measuring means, to determine distance data.

The power-transmission device is preferably a combustion engine or electric motor, a hydraulic, pneumatic, mechanical, or electric power-transmission device, or both of the aforesaid, i.e. a motor and a power-transmission device. All of the aforementioned power-transmission devices are such that a change in their state creates a change in the amount of energy available to the first operating device and through that affects the operation of the first operating device. In addition, advantageously in one case a change in state can create a change in the amount of power available to the first operating device instead of a change in the amount of energy.

In the method, the selected property of 2-50 trees, preferably 2-20 trees, most preferably 3-10 trees is measured with the aid of observation means, on the basis of electromagnetic radiation, at a distance from the tree. By measuring several trees at a time, it is possible to estimate the need to move the crane, for example in thinning, in which several trees are often in side by side. On the basis of this estimate the power level required from the engine can be adjusted to produce sufficient power for the first operating device.

The change in the state of the power-transmission device can be a change in the revolutions of the combustion engine or electric motor, or a change in the volume flow or pressure of a hydraulic or pneumatic power-transmission device, a change in attitude of a mechanical power-transmission device, or a change in the voltage or current of electrical power-transmission device. The use of a change of state is intended to prepare for a change in the energy level required by the first operating device and to direct the power-transmission device to a correct optimal energy consumption and to achieve the optimal operation of the first operating device.

The selected property of the tree is preferably measured by measuring electromagnetic radiation in the 1.0-40.0-Ghz or 350 THz-1-Phz range.

After the change in state of the power-transmission device, the selected amount of energy is preferably transmitted using the power-transmission device or by a selected output, which in terms of its amount or power is optimized on the basis of the measurement data of the tree.

In the method, the tree to be processed next by the harvester head is preferably selected, the selected tree is identified, the measurement data of the selected tree are selected as a basis for control, and the power-transmission device is controlled to create a change of state on the basis of the tree's measurement data, before the harvester head makes contact with the tree. Based on the identification of the tree, the measurement data stored in the memory concerning the tree can be associated with the relevant tree, which will be processed next, and on its basis the power-transmission device can be controlled.

According to one embodiment, the tree to be processed is identified from a separate activation command given by the operator. The system does not then need to identify the tree independently.

According to a first embodiment, the tree to be processed is identified automatically with the aid of software means, the tree to be processed being the tree in the direction of movement of the crane's path of motion, relative to which the distance of the harvester head diminished most rapidly on the basis of the first position data or second position data or both, of the measurement data. The operator then does not have a separate work stage to identify the tree.

According to a second embodiment, the tree to be processed is identified automatically with the aid of software means, the tree to be processed being the tree nearest the harvester head on the basis of the first position data or second position data or both of the measurement data.

According to a third embodiment, the tree to be processed is identified automatically with the aid of software means, the tree to be processed being the tree shown in the work order made on the basis of the measurement data, which is shown to be next in the work order. The work order can be, for example, the order optimized on the basis of the measurement data, in which the trees should be processed to achieve maximum work efficiency.

According to one embodiment in the method on the basis of at least one tree's measurement data is controlled both the combustion engine or electric motor as the power-transmission device and the hydraulic, pneumatic, mechanical, or electric power-transmission device, before the harvester head contacts the tree. Aspects of the operation of the harvester head can then be optimized from different viewpoints, thus increasing the benefit achieved by the optimization.

Preferably the change in state of the power-transmission device is a change in the revolutions of the forest machine's engine or alternatively a change in the output of the pump acting as the power-transmission device. A change in these particularly affects the operation of the forest machine, so that an even operation of the forest machine can be achieved, in which trees of different sizes being processed will not cause the operations of the forest machine to slow due to a lack of energy. On the other hand, energy is not wasted by using too high revolutions of the engine, or similar.

In the method, the property of a tree already in the register is preferably measured again during the next measurement to process the measurement data in the register with a selected criterion. The same tree is then measured more than once and certainty of the reliability of the measurement increases.

The selected criterion can be a deviation of more than 5% in the consecutive measurement data of the same tree.

According to one embodiment the measurement data in the register is processed by replacing it with the mean value of the same tree's measurement data. Using the mean value will get sufficiently close to the correct data.

Alternatively, some other known combination of measurement data or known filtering of measurement data, such as, for example, a Kalman filter, can also be used to process the measurement data.

The invention is also intended to create a better system than systems of the prior art, with the aid of which the properties of a tree can be measured more accurately before contact with the tree to be handled, and in which the energy required by the first operating device creating a change in the attitude, location, or state of the harvester head will be available immediately the harvester head makes contact with the tree. The system according to the invention is characterized by a system for controlling power-transmission device in a forest machine, which includes a chassis, a harvester head for processing trees, a crane pivoted to the chassis for suspending the harvester head, a first operating device for creating a change of attitude, location, or state of the harvester head and power-transmission device for transmitting energy to the first operating device. The system includes observation means for measuring a selected property of a tree to create measurement data, which observation means are arranged to detect electromagnetic radiation and thus to measure a selected property of at least two trees based on electromagnetic radiation at a distance from the tree being measured. In addition, the system includes software means arranged to record the measurement data to form a register, to control the power-transmission device to achieve a change of state in the power-transmission device on the basis of the measurement data of at least one tree before the harvester head contacts the tree, and the performance of the operation of the operating device to optimize the operation of the operating device, to direct the power-transmission device to the next tree in the register on the basis of the relevant tree's measurement data and to repeat the measurement and control operations.

By means of the system according to the invention, the state of the forest machine's power-transmission device can be altered beforehand by estimating a selected property of more than one tree without physical contact with the tree by using electromagnetic radiation. In other words, the definition of the measurement data takes place remotely and beforehand before the harvester head contacts the tree's trunk. The system according to the invention can be implemented without requiring harvester-head sensors to measure the property of the tree, with the aid of which an estimate of a tree's diameter has been made in the prior art. In addition, the system according to the invention can determine properties of a tree more comprehensively than systems of the prior art based on contact, other than only the absolute dimensions of the tree, for example, its species, quality, number of branches, and the strength/thick-ness of the branches. The system according to the invention can also be easily retrofitted to existing forest machines, in addition to being installed as original equipment at the factory.

The system also preferably includes a computation unit comprising the said memory and software means and data transfer means for transferring data between the observation means and computation unit and the computation unit and the power-transmission device. The system can then also be installed in forest machines in which the system according to the invention cannot be integrated in the forest machine's own control system.

The observation means are preferably optical observation means, radio-wave observation means, or both. With their aid by measuring electromagnetic radiation the tree's properties can be determined at a distance from the tree without physical contact. The aforementioned observation means are also very compact and can thus be freely located in a forest machine.

The optical observation means can be a camera or a laser measuring means or both. Measuring with the aid of an optical observation means is more accurate to implement than, for example, measuring with the aid of radio-wave observation means based on radio-waves.

The radio-wave observation means are preferably radio observation means for the measurement of the properties of trees, based on radio-waves. In terms of cost, the implementation of radio-wave observation means based on the use of radio-waves is cheaper than, for example, the use of echo sounding.

According to one embodiment, the optical observation means are a combination of a camera and laser measuring means. Thus, with the aid of laser measuring means the distance of the camera from the tree can be determined to decide the tree's absolute dimensions and with the aid of the camera the more important details of the tree are determined.

According to a second embodiment the optical observation means are two cameras or a stereo camera to create a three-dimensional image and through it to determine the tree's absolute dimensions. There is then no need for a separate observation means, such as radar or a laser measuring means, to determine the distance data.

The first operating device is preferably a second operating device belonging to the harvester head or a third operating device belonging to the crane. The operation of these operating devices and the energy they need are affected essentially by the properties of the tree being processed.

According to one embodiment the observation means are located in the forest machine. They then receive their operating power from the forest machine and can use the forest machine's positioning means to obtain position data.

According to a second embodiment the said observation means are located in a flying imaging drone. With the aid of the imaging drone the measurement data of the trees can be measured already beforehand.

In addition, the system can include positioning means to determine the forest ma-chine's position data. The position data can be exploited to identify trees when processing trees.

The invention is also intended to create a more efficient forest machine than forest machines of the prior art. The forest machine according to the invention is characterized by a forest machine that includes a chassis, a harvester head for processing trees, a crane pivoted to the chassis to suspend the harvester head, a first operating device to create a change in the harvester head's attitude, location, or state, power-transmission device to transmit power to the first operating device, and a system according to any of the aforementioned embodiments to control the power-transmission device.

By means of the method and system according to the invention the amount of energy transmitted from the power-transmission device to the first operating device is optimized to correspond to the energy required by the first operating device, so that the operating of the first operating device is efficient and the power-transmission device is not loaded unnecessarily. In addition, the optimization can be performed beforehand before the energy is needed, when the necessary energy will be immediately available when the first operating device needs it.

BRIEF DESCRIPTION OF THE DRAWINGS

In the following, the invention is described in detail with reference to the accompanying drawings showing some embodiments of the invention, in which.

DETAILED DESCRIPTION OF THE INVENTION

Figure 1A:
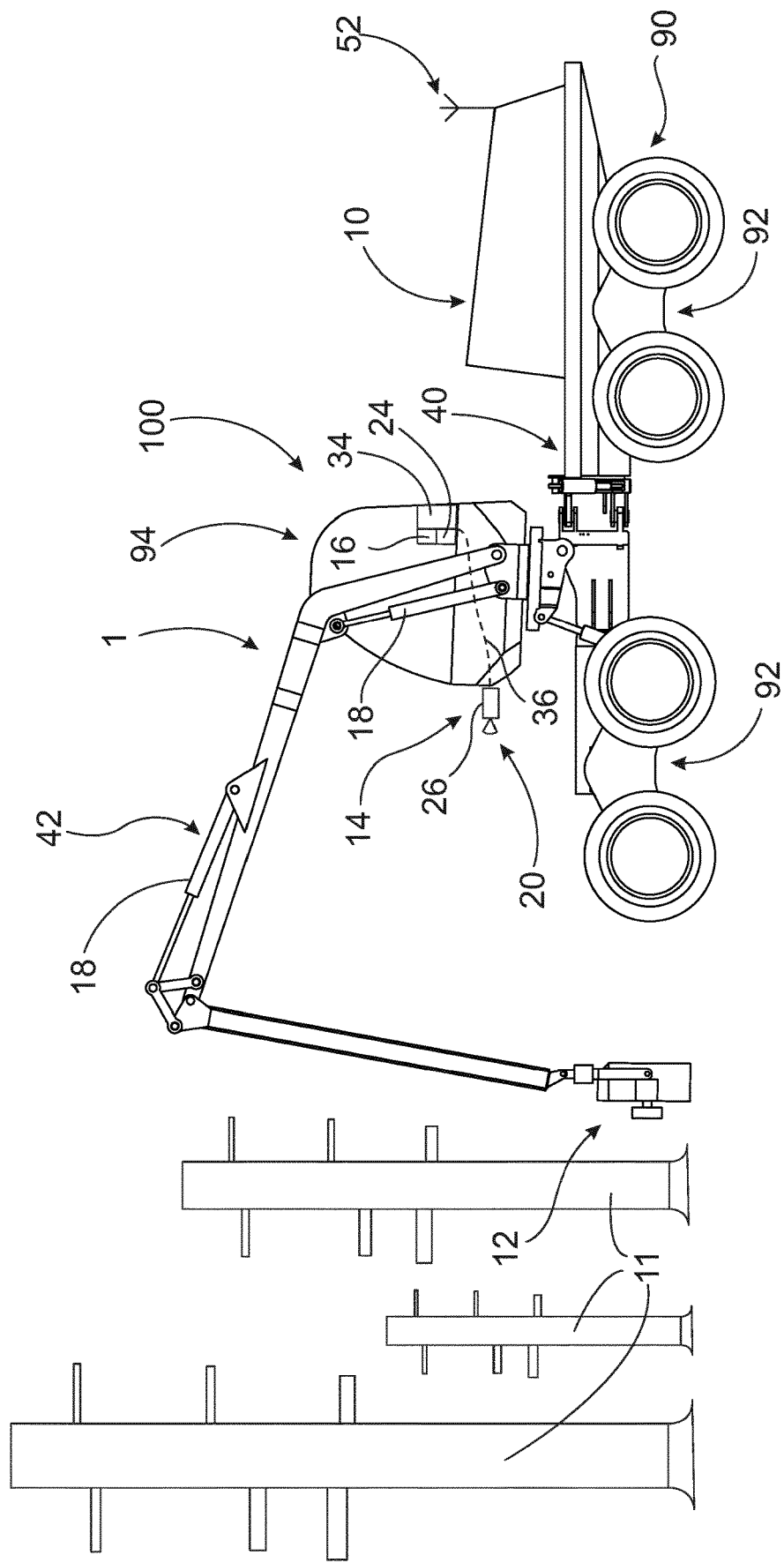
FIG. 1a shows a side view of a first embodiment of the forest machine according to the invention.
Figure 1B:
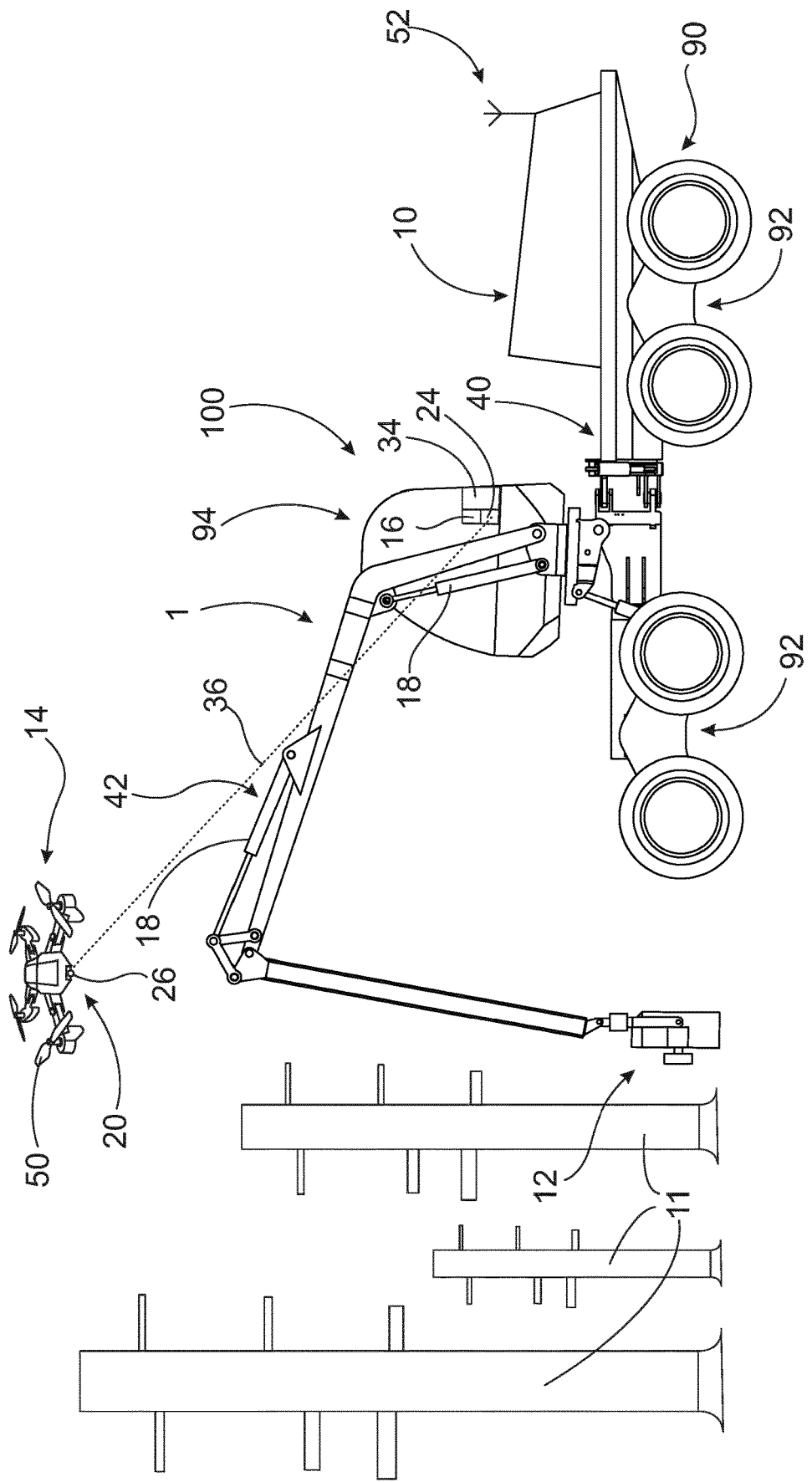
FIG. 1b shows a side view of a second embodiment of the forest machine according to the invention.

FIGS. 1a and 1b show the forest machine 100 according to the invention. In its basic construction, the forest machine 100 corresponds to forest machines of the prior art, i.e. the forest machine 100 includes a chassis 40 and a base 90 pivoted under the chassis 40, which can be, for example, like FIG. 1 a construction formed of sets of bogie wheels 92 pivoted to the chassis 40 or, for example, a construction using a crawler-track base. In addition, the forest machine 100 includes in the usual manner a cab 94, a power-transmission device 10, such as, for example a combustion engine, a crane 42 pivoted to the chassis 40, and a harvester head 12 suspended from the crane 42 for processing trees 11. To control the forest machine 100, the forest machine 100 includes a control system, which preferably includes a vehicle PC comprising at least a computation unit 34, a memory 24, and data-transfer means 36. In a modem forest machine 100, for example, the various operations of the harvester head 12 and crane 42 are monitored with the aid of sensors and the operation of the harvester head 12 and crane 42 are controlled and partly automated using the computation unit 34. Measurement data is transferred from the sensors to the computation unit 34 using the data-transfer means 36 and the measurement data is analysed by the computation unit 34 and the results stored in the memory.

Using the system 1 according to the invention a forest machine of the prior art can be transformed into a forest machine 100 according to the invention, in which the operation of the power-transmission device 10 is optimized on the basis of the trees 11 being processed.

Figure 2:
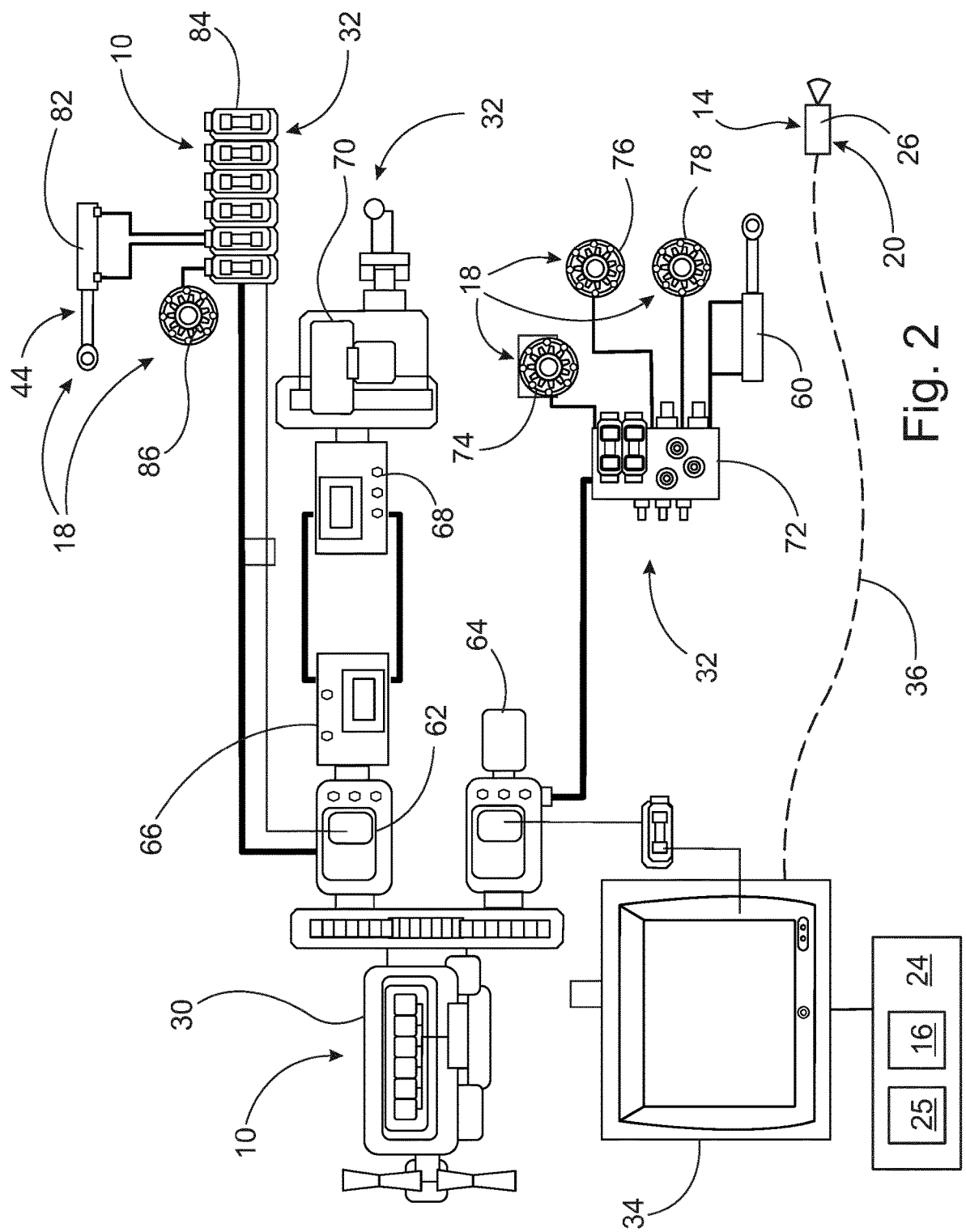
FIG. 2 shows a schematic block diagram of the system according to the invention.

FIG. 2 shows the construction of the system 1 according to the invention in greater detail. At a minimum, the system 1 according to the invention includes, as components, observation means 14 and software means 16. These two parts can be joined to form part of a forest machine according to the prior art, the components belonging to which can be the other components shown in FIG. 2. In the system 1 according to the invention, a tree's selected property is measured at a distance with the aid of observation means, using electromagnetic radiation. The observation means 14 can be optical or radio-wave observation means, in the case of FIGS. 1a-2 optical observation means 20 and more precisely a camera 26. The measurement data created using the observation means 14 can be transferred preferably over data-transfer means 36 belonging to the forest machine 100 preferably to the computation unit 34 of the control system belonging to the forest machine 100. Stored in the computation unit's 34 memory 24 are the software means 16 belonging to the system 1, which further, using the aforementioned data-transfer means 36 control the forest machine's 100 selected power-transmission device 10 to transmit a suitable amount of energy to the selected first operating device of the forest machine. In addition, the memory 24 includes a register 25, in which the measurement data are stored, in order to control the power-transmission device 10.

When referring to the power-transmission device 10, one can mean a power source, which can be, for example, the combustion engine 30, preferably a diesel engine, of the forest machine according to FIG. 2. Instead of a combustion engine, an electric motor, for example, can be used. On the other hand, in this context the term power-transmission device 10 can also refer to components 32 of the power transmission 16 of the forest machine, such as, for example, the crane's hydraulic pump 62, the hydraulic power transmission's pump 66, the drive motor 68 i.e. the drive power-transmission motor, the gearbox 70, the crane's valve manifold 84, the harvester head's hydraulic pump 60, the cooling circuit's pump 64, or the harvester head's valve manifold 72. The aforementioned are examples of the forest machine's power-transmission device, the energy transmission of which can be optimized using the system 1 according to the invention. The operating devices, to which energy is transmitted by the power-transmission device 10, can be, for example, as the crane's operating devices, that is the hydraulic cylinders 82 acting as the third operating devices 44, the crane's rotation motor 86, as the harvester head's operating devices, that is the hydraulic cylinders 80 acting as the second operating devices 38, the harvester head's rotation device 74, the cutting saw's motor 76, or the feed rollers' motors 78. All of the aforementioned operating devices are characterized in that through their operation a change is achieved in the harvester head's attitude, location, or state.

More specifically, the optical observation means are preferably a camera or laser observation means, such as, for example, Lidar observation means. The operation of the optical observation means is based on the electromagnetic radiation reflected from the tree, i.e. the light reflected from the tree. The camera or laser observation means receive the light with the aid of their cell. When using laser observation means, the light reflected is produced with the aid of a laser observation means' laser light and the light reflected back from the tree is measured. When using a camera only the light from other light sources reflected from the tree is received. The camera used can be, for example, that made by the manufacturer Orlaco and marketed under the product name EMOS, the light sensitivity of which can be 4.0-6.0 V/lux-sec (scotopic-vision property <0.1 lux), vibration resistance 15 GRMS 24-2000 Hz, and impact resistance 50 G.

If only camera technology is used to measure the tree's property, a separate unit, two cameras or a stereo camera, intended for measuring the distance between the tree and the camera must be used to determine the tree's absolute dimensions. The aforesaid separate unit can be, for example, laser observation means or radar based on radio-waves, with the aid of which the distance can be measured with sufficient reliability. With the aid of two cameras or a stereo camera a three-dimensional image of the tree can be created, when on the basis of the distance between the cameras, software means can be used to decide the distance between the tree and the camera, to determine the tree's absolute dimensions without physically contacting the tree.

If the optical observation means are laser observation means, it is possible to use in the system, for example, the manufacturer Velodyne LiDAR's laser observation means marketed under the product name VLP-16, which can measure up to 600 000 dots per second.

Instead of optical observation means, radio-wave observation means can be used, which can be, for example, radar based on the use of radio-waves. With the system it is possible to use, for example, radar manufactured by Robert Bosch GmbH and marketed under the product name mid-range radar sensor (MMR), which uses 4.5-W power and has a 76-77-Ghz frequency range.

The observation means 14 of the system according to the invention can be located in connection with the forest machine 100 according to FIG. 1a. The observation means 14 are preferably attached to the forest machine's 100 cab 94, when they have good visibility towards the trees for most of the time. The crane 42 and the harvester head 12 can at times obstruct vision, but the measurement of the selected property of the tree 11 is preferably performed several times before the harvester head 12 contacts the tree, so that several reliable observations of the tree 11 can be obtained. The observation means 14 fitted in connection with the cab 94 are also protected from impacts and knocks. Alternatively, the observation means can be placed in connection with the forest machine's harvester head, when they have a better view of the tree being measured. On the other hand, in the harvester head the observation means are more liable to knocks and impacts than when placed in the cab. The observation means are preferably powered from the forest machine's power source.

According to the embodiment shown in FIG. 1b the observation means 14 can also be located in a separate imaging drone 50. The imaging drone 50 can be, for example, a single quadrocopter, i.e. drone, or a group of several drones, with the aid of which more comprehensive image data can be created. With the aid of an imaging drone 50 a map can be drawn beforehand of the forest area of the trees 11 to be processed, containing the measurement data of individual trees, before the forest machine 100 arrives in the forest. The map created can be sent, for example, using wireless data-transmission means 36 directly to the forest machine 100, or the map can first be downloaded from the imaging drone, for example, over a wired connection to a portable computer and from there wirelessly or wired to the forest machine. With the aid of a predefined map, the working of the forest machine and, for example, laying-off can be optimized more precisely. The term laying-off refers to the definition of the cutting points on the tree trunks, taking into account the timber type and dimensions requirements. Reference number 52 shows the positioning means preferably belonging to the forest machine 100, with the aid of which the forest machine's 100 position in the forest can be determined.

Figure 3:
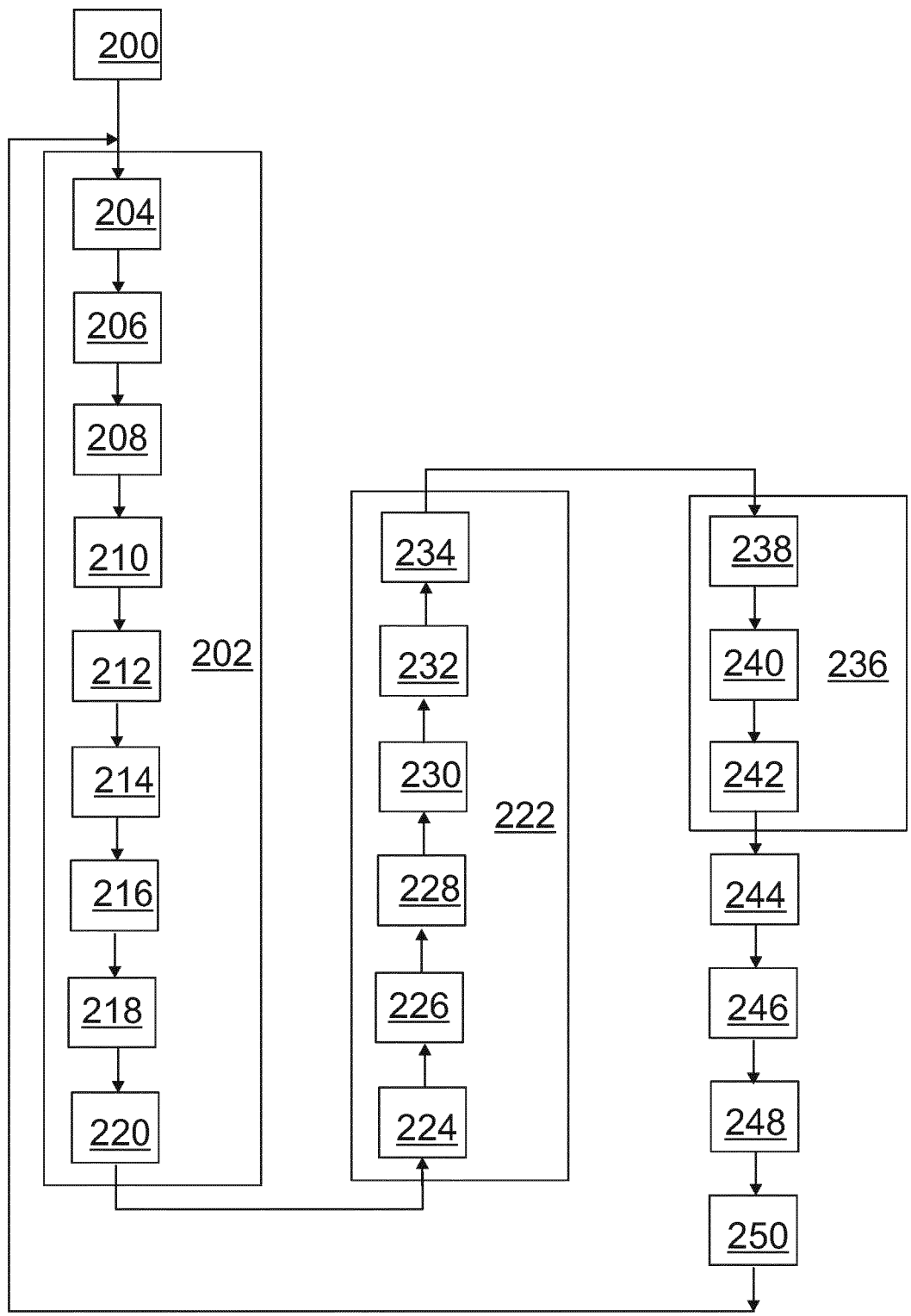
FIG. 3 shows a block diagram of the stages of the method according to the invention.

The stages of the method according to the invention are shown in FIG. 3 through an embodiment. In the method, the forest machine moves in a forest towards the trees to be felled according to stage 200 just as in the prior art. In stage 202, a selected property of at least two trees is measured, with the aid of observation means on the basis of electromagnetic radiation, at a distance from the trees being measured, in order to create measurement data. More specifically, stage 202 can be divided into several sub-stages, in which in stage 204 the observation means are used to observe the surroundings continuously. If the observation means are, for example, a camera, the camera is used to takes images continuously at a selected frequency, for example, 10 images per second. In stage 206, data-transmission means are used to send the images to software means stored in the memory of the computation unit, which in stage 208 preferably combine time data with each image and, for example, using the positioning means of the forest machine, the forest machine's position data p0.1, and record the combined data in a register in the memory. In stage 210, the software means identify the trees from the image, for example on the basis of shape, colour, or similar, for example, in the manner of software exploiting machine vision. In stage 212 the software means determine the selected property, for example the tree's diameter, from the identified trees. The properties to be determined can also be more than one. In stage 214 the software means can preferably also determine the camera's distance from each tree, for example on the basis of the measurement data of laser observation means. In stage 216 the software means use the distance data to calculate each tree's first position data p1 on the basis of the forest machine's position data p0.1 and the distance data. In stage 218, each tree's first position data p1 can be combined with the relevant tree's measurement data d and be recorded in the computation unit's memory in stage 220.

According to stage 222, the software means are arranged to detect a situation, in which the next tree to be processed has been selected and after identifying the situation to perform a change of state in the power-transmission device before the harvester head contacts the tree. Stage 222 can be divided into several sub-stages, in which in stage 224 the selection of the tree to be processed is identified, for example, by a separate activation command given by the operator, which can be, for example, pressing a selection button. Alternatively, the selection can be identified with the aid of software means automatically, for example, from the path of motion of the crane's harvester head moving farther from the base of the crane, which is direction towards the tree, and the crane's rotation being stopped, and from the attitude of the harvester head's debranching jaws, which are open. Further, the selection can be based on the distance of the harvester head from the trees, or on a previously prepared work arrangement, according to which the trees are processed. If all the aforementioned attitudes and paths of motion of the crane and harvester head are met simultaneously, the software means decide that the tree has been selected. Then, according to stage 226, for example, when a camera is acting as the observation means, the camera is again used to take more images, from which, in stage 228, the software means identify the trees in the manner described above.

In stage 230 the software means can preferably also determine the distance data telling the distance of the camera to each tree, for example, on the basis of laser observation means measurement data. In stage 232 the software means use the distance data to calculate each tree's second position data p2 on the basis of the forest machine's position data p0.2 and the distance data. In stage 234 the tree's second position data p2 can be compared with the tree's first measurement data stored in the memory's register and on its basis the selected tree can be identified as a particular tree, the measurement data of which have been previously determined and stored in connection with the first position data.

According to stage 236, after identifying the tree to be processed the software means are arranged to use the tree's measurement data to create a change of state in the power-transmission device. Stage 236 can be divided into sub-stages, in which in stage 238 the said measurement data is compared with the aid of the software means with a database pre-stored in the memory, comprising measurement data on the property of the selected tree and the correlation with the amount of energy to be transmitted from the power-transmission device or some other correlation with selected operation of the selected first operating device. In stage 240 the amount of energy needed to be transmitted from the power-transmission device is determined on the basis of the measurement data with the aid correlation and in stage 242 the forest ma-chine's control system is used with the aid of the software means to create the required change in the state of the power-transmission device. The change of state can be, for example, a momentary increase in the engine's revolutions. This achieves the transmission of the amount of energy, required in terms of the operation of the first operating device, from the power-transmission device to the first operating device. In stage 244, a sufficient amount of energy is transmitted from the power-transmission device to the first operating device, which in stage 246 performs the selected operation of the first operating device using the transmitted energy. After this, a new measurement is preferably made, on the basis of which the trees' measurement data in the register can be edited. In stage 248, the power-transmission device is again controlled on the basis of the next tree's measurement data stored in the register, to transmit energy to the first operating device. In stage 250 stages 202-248 are repeated.

As an alternative to the implementation described above, the method according to the invention can also be implemented in such a way that the selected property of the trees is only determined in the stage in which the selection of the tree to be processed has been identified.

With the power-transmission device being a hydraulic, pneumatic, mechanical, or electric power-transmission device, the change of state achieved through the control can be a change, for example, in volume flow, pressure, capacity of the hydraulic pump or of the hydraulic motor by altering, for example, the rotational volume of the pump. With the power-transmission device being an engine, the change of state achieved can be a change in the engine's revolutions, or software parameter changes affecting the engine's behavior (the so-called injection chart is altered).

If the forest machine does not include a control system that is compatible with the system according to the invention, the system can, in addition, include a separate computation unit, which comprises memory for software means, as well as data-transmission means between the observation means and the computation unit and between the computation unit and the power-transmission device.

Though earlier in the description of the invention the software means have been presented as using a computation unit to control the power-transmission device, it should be understood that there can be separate local control units between the power-transmission device and the computation unit, such as, for example, a separate grapple computer in the harvester head. The data-transmission means used in the system according to the invention are preferably as such a forest machine's own known CAN bus, or alternatively an ArcNET bus, but also other wired and wireless data-transmission means can be used. Particularly if the observation means are attached to an imaging drone, the data-transmission means are preferably wireless, such as Wi-Fi.

According to one embodiment, the observation means consist of a Laser distance meter and an absolute-angle sensor. The following logic is then used in measurement, which is based on the fact that it is not possible to see through a tree trunk. Only measurement progressing mainly over a segment of a circle forms a trunk, which has a front edge and a rear edge. The diameter of the trunk has an upper limit, as has the radius. When an object farther than the rear edge of the trunk is observed, the diameter of the trunk and the position of the centre point are calculated, objects farther than the measured radius being empty. The use of such observation means is described in greater detail in patent publication FI 101016 B, beginning on line 15 of page 2 and ending on line 4 of page 3, and beginning on line 15 of page 3 and ending on line 4 of page 4.

Though this does not belong to the invention, the observation means and software means of the system according to the invention can also be used to guide the laying-off of a tree.

The invention claimed is:

1. A method for controlling a power-transmission device in a forest machine comprising a crane and a harvester head suspended from the crane, the method comprising:
    measuring a selected property of at least first and second trees with aid of observation means using electromagnetic radiation at a distance from the at least first and second trees to create measurement data for the at least first and second trees;
    storing the measurement data of the at least first and second trees in a register of the trees' measurement data belonging to a memory for controlling the power-transmission device;
    controlling the power-transmission device with aid of a software means, on a basis of the measurement data of the first tree, to create a change in a state of the power-transmission device before the harvester head contacts the first tree so that the power-transmission device transfers to a first operating device belonging to the forest machine an amount of energy optimized on the basis of the measurement data in terms of performing a selected operation;
    performing the selected operation of the first operating device using the amount of energy transferred by the power-transmission device after the change in state of the power-transmission device, in which the operation of the first operating device creates a change in the attitude, location, or state of the harvester head, or a combination of the aforesaid;
    controlling the power-transmission device at the second tree in the register on a basis of the measurement data of the second tree in the register; and
    repeating the foregoing steps on subsequent trees, wherein the second tree becomes a new first tree and a tree subsequent to the second tree becomes a new second tree for performing the foregoing steps.

2. The method according to claim 1, wherein the step of measuring the selected property of the at least first and second trees includes using at least one of optical observation means and radio-wave observation.

3. The method according to claim 1, wherein the step of measuring the selected property includes measuring at least one property of the following group: tree diameter, a tree height, tree species, tree quality, tree volume, distance of the trees from each other, number of tree branches and strength and thickness of the branches.

4. The method according to claim 1, wherein the step of measuring the selected property of each tree includes measuring the selected property 2-10 times before the harvester head contacts the tree, to improve reliability of the measurement.

5. The method according to claim 1, including contactlessly measuring, with aid of the observation means, the selected property of 2-100 trees on a basis of electromagnetic radiation.

6. The method according to claim 1, including basing the change of state of the power-transmission device on the measurement data of the tree in the following stages:
    comparing the measurement data with aid of the software means to a database pre-stored in the memory comprising measurement data on the selected property of the tree and a correlation of the measurement data of the selected property of the tree with the amount of energy required to be transmitted from the power-transmission device for the selected operation of the first operating device,
    determining the amount of energy required to be transmitted from the power-transmission device with aid of the correlation on basis of the measurement data, and
    controlling with aid of the software means the power-transmission device to achieve the change of state, so that the amount of energy to be transmitted from the power-transmission device to the first operating device is achieved.

7. The method according to claim 1, wherein the step of measuring the selected property includes measuring electromagnetic radiation in the 1.0 to 40.0 Ghz or 350 THz to 1 Phz frequency range.

8. The method according to claim 1, wherein the power-transmission device is:
A) a combustion engine or electric motor or
B) a hydraulic, pneumatic, mechanical, or electric power-transmission device, or
both A) and B) of the aforementioned, and the change of state of the power-transmission device is a change in a revolution speed of the combustion engine or the electric motor or a change in a volume flow or pressure of the hydraulic or pneumatic power-transmission device, an attitude change of the mechanical power transmission device, or a voltage or current change in the electric power-transmission device.

9. The method according to claim 1, including selecting a tree to be processed next by the harvester head, identifying the selected tree, selecting the selected tree's measurement data as a base for control, and controlling the power-transmission device to create a change of state on the basis of the selected tree's measurement data, before the harvester contacts the selected tree.

10. The method according to claim 9, wherein the step of identifying the selected tree to be processed includes automatically identifying with aid of the software means, wherein the selected tree to be processed is the tree in a direction of movement of a path of motion of a crane of the forest machine, relative to which a distance of the harvester head diminishes at a greatest speed on a basis of first position data or second position data or both of the first and second position data.

11. The method according to claim 9, wherein the selected tree to be processed is identified automatically with aid of the software means, the selected tree to be processed being the tree nearest the harvester head on a basis of the first position data or second position data or both of the first and second position data.

12. The method according to claim 9, wherein the selected tree to be processed is identified automatically with aid of the software means, the selected tree to be processed being the tree shown to be next in a working order made on a basis of the measurement data.

13. The method according to claim 1, further including re-measuring a tree already in the register to obtain re-measured measurement data for editing the tree's measurement data already in the register using a selected criterion.

14. The method according to claim 13, wherein the step of using a selected criterion includes using a mean value of the tree's measurement data already in the register and the re-measured measurement data and replacing the measurement data already in register with the mean value of the tree's measurement data.

15. A system for controlling a power-transmission device in a forest machine having a chassis, a harvester head for processing trees, a crane pivoted to the chassis for suspending the harvester head, a first operating device for creating a change in the harvester head's attitude, location, or state, and a power-transmission device for transmitting energy to the first operating device, the system including:
observation means for detecting electromagnetic radiation and measuring a selected property of at least first and second trees on a basis of the electromagnetic radiation at a distance from the trees being measured, to create measurement data; and
software means arranged to conduct the following steps:
record the measurement data of the observation means in a memory to create a register,
control the power-transmission device on a basis of the measurement data of at least the first tree to create a change of state in the power-transmission device before the harvester head contacts the first tree thus permitting sufficient energy to be sent to the first operating device to optimize and perform an operation of the first operating device,
control the power-transmission device at the second tree in the register on basis of the measurement data of the second tree before the harvester head contacts the second tree in the register, and
repeat operations of the observation means and the software means on trees subsequent to the second tree, wherein the second tree becomes a new first tree and a tree subsequent to the second tree becomes a new second tree on which the observation means and software means operate.

16. The system according to claim 15, wherein the observation means are optical observation means or radio-wave observation means or both.

17. The system according to claim 16, wherein the optical observation means are at least one of a camera and a laser measuring means.

18. The system according to claim 15, wherein the observation means are situated in the forest machine.

19. The system according to claim 15, wherein the observation means are situated in a flying imaging drone.

20. A forest machine comprising: a chassis, a harvester head for processing trees, a crane pivoted to the chassis for suspending the harvester head, a first operating device for creating a change in the harvester head's attitude, location, or state, a power-transmission device for transmitting power to the first operating device, and the system according to claim 15 for controlling the power-transmission device.

* * * * *